United States Patent [19]
Decker et al.

[11] 3,973,435
[45] Aug. 10, 1976

[54] CABLE ANCHOR

[75] Inventors: Elmer L. Decker, Long Beach; James Moon, Santa Ana, both of Calif.

[73] Assignee: Decker Engineering, Long Beach, Calif.

[22] Filed: Apr. 18, 1975

[21] Appl. No.: 569,583

[52] U.S. Cl. .............................................. 73/143
[51] Int. Cl.² ........................................ G01L 5/08
[58] Field of Search ................................... 73/143

[56] References Cited
UNITED STATES PATENTS

| | | | |
|---|---|---|---|
| 2,700,304 | 1/1955 | Decker | 73/143 |
| 3,056,287 | 10/1962 | Gillett | 73/143 |

*Primary Examiner*—Charles A. Ruehl

[57] ABSTRACT

The following specification discloses an anchor for a cable employed in rotary drilling rigs for oil well derricks. Tension on the anchored cable is measured through a load cell in connected relationship to the anchor. The anchor comprises a drum upon which the cable is wound and snubbed, and is journaled for partial rotative connection around a spindle on a base member. The drum is fabricated from weldments in a unique manner and employs a weigh beam that is triangularly braced to incorporate maximum strength to the welded drum to which it is attached. In addition thereto, the weigh beam is oriented for optimization of the transfer of rotative tension forces on the drum to the weigh beam and then to the load cell in a manner whereby the movement of the weigh beam describes a substantially uniform movement through its operative functions. The drum has a series of bolts located around the outer circumference of the drum with hollow rolling cylinders around each bolt to decrease the frictional engagement and provide more ready movement to the cable when it is being moved around the drum.

7 Claims, 16 Drawing Figures

CABLE ANCHOR

BACKGROUND OF THE INVENTION

1. Field of the Invention

The field of this invention lies within the cable anchoring art. More particularly, it lies within the field of anchoring or snubbing such cables around a drum wherein the cable is utilized for oil well drilling functions.

The tension on the cable is measured through the rotative movement of the drum by means of a load cell which provides a reading as well as an anchoring thereof.

2. The Prior Art

The prior art related to cable anchor weighing devices, and load testing deadline anchors for oil well derricks, generally comprises U.S. Pat. Nos. issued to E. L. Decker, 24,092, 2,807,957, 2,984,103, and 3,045,480; to J. D. Spalding, 2,488,070; and, to F. L. Gillett, 3,056,287.

The foregoing prior art generally incorporates various features in order to anchor, as well as determine the tension on a line.

One of the more popular cable anchors is that patented by Gillett, U.S. Pat. No. 3,056,287. Generally, this cable anchor incorporates what is referred to as a snubbing drum which is rotatively mounted on a stub shaft or spindle by means of axially spaced bearings. The drum is provided with axially spaced radial flanges at its outer periphery and an inner tapered snubbing surface. A weigh beam or torque arm is attached to the drum at one end and carries a releasable cable clamp at its opposite end. The releasable cable clamp is tangentially aligned with the snubbing surface of the drum. A cable or line extending from a storage reel passes through the clamp, is wrapped several times around the drum, and passes upwardly to the hoisting blocks.

The clamping means can be released so that increased amounts of cable from the storage reel can be let out and placed around the snubbing surface of the drum.

The cable anchor is also connected to what is referred to as a load cell. The load cells are generally hydraulic load cells, but can be in other forms responsive to movement or rotation of the snubbing drum.

The load cell is located between the torque arm and the anchor base. Weight or tension on the cable causes movement of the drum. This movement is transmitted to the load cell through the torque arm.

The foregoing hydraulic load cells are connected so that movement of the torque arm creates a positive amount of pressure in a hydraulic line. A Bourdon tube in fluid connected relationship to a hydraulic pressure line of the load cell and a meter provides a direct reading of pressure changes corresponding to load changes in the cable.

A substantial drawback of the prior art is that the foregoing drums or cable anchors, such as that shown in the Gillett patent, are cast or made of materials that are quite expensive. This invention overcomes the requirement for a cast structure in the drum by virtue of its unique design. The invention incorporates a series of radial arms that form the rigidifying spokes of the drum in an optimum manner in combination with a weigh beam configuration. A superior anchor is provided, resulting in improved performance to the cable anchor and cable load measuring system.

In particular, the invention provides a unique weigh beam or torque arm configuration which is superior to that of the prior art. The weigh beam or arm is in the form of a triangularly braced weigh beam that is in offset relationship with regard to the mounting point of the drum. That is, the bore through the drum for attachment to the stub shaft is offset with regard to the axial center of the drum to allow for an improved movement of the weigh beam with respect to the load cell.

The weigh beam of the invention is braced with a triangular bracing element that extends from the periphery or circumferential edge of one portion of the drum to the extremities of the weigh beam. This provides a dual bracing for the drum, as well as the weigh beam, and partially allows for a welded drum to be utilized. The placement of the drum and weigh beam on the supporting structure allows for an optimum readout by the weigh beam.

In addition to the foregoing features of this invention, the position of the weigh beam and the geometrical movement described thereby is substantially enhanced over the prior art. In the prior art, the torque arm or weigh beam, moved through an arc or radius which did not uniformly reflect the analog, in a geometrical sense, of the actual movement or corresponding tension applied to the cable around the drum. It has been found that the end of the weigh beam of this invention describes a movement that corresponds to a direct parallelogram movement of the entire device. A more uniform and even movement of the weigh beam is thus provided corresponding to the tension on the cable, resulting in more accurate response by the load cell and readout thereon.

As a consequence, this invention is a substantial improvement as far as structural characteristics and performance over the prior art.

SUMMARY OF THE INVENTION

In summation, this invention provides a cable anchor for an oil well derrick that is of a superior structure, as to configuration and assembly, as well as providing improved performance through the weigh beam which is connected to a load cell.

In particular, the invention utilizes a drum having spokes or radial extensions that terminate in an off-center bore from the center axis. The off-center bore supports the radial extensions within the drum for improved operation of the weigh beam.

The weigh beam comprises a beam member with a triangular member coextensive therewith to rigidify, brace, and enhance the overall configuration and structure of the drum.

The entire structure of the weigh beam and the movement of the drum in its offset axis allows for a substantially parallelogram geometrical description or trace of the movement of all the elements, so that an improved readout from a load cell connected to the weigh beam can be effectuated.

In addition to the foregoing features of this invention, a number of bolts around the outer circumference of the drum are covered by cylindrical elements that provide a rotatable bearing surface for the cable which is moved between them and the drum surface to effectuate smooth frictionally eased movement of the cable.

As a consequence, the invention incorporates improved operational features as to the readout on the load cell, as well as operation of the entire device when a cable is moved between the snubbing surface of the drum. Additionally, the manufacture and quality of the end product is enhanced by the structure and general configuration as will be described hereinafter.

BRIEF DESCRIPTION OF THE DRAWINGS

The invention will be more clearly understood by reference to the description below taken in conjunction with the accompanying drawings wherein.

DESCRIPTION OF THE PREFERRED EMBODIMENTS

Figures 1, 2:
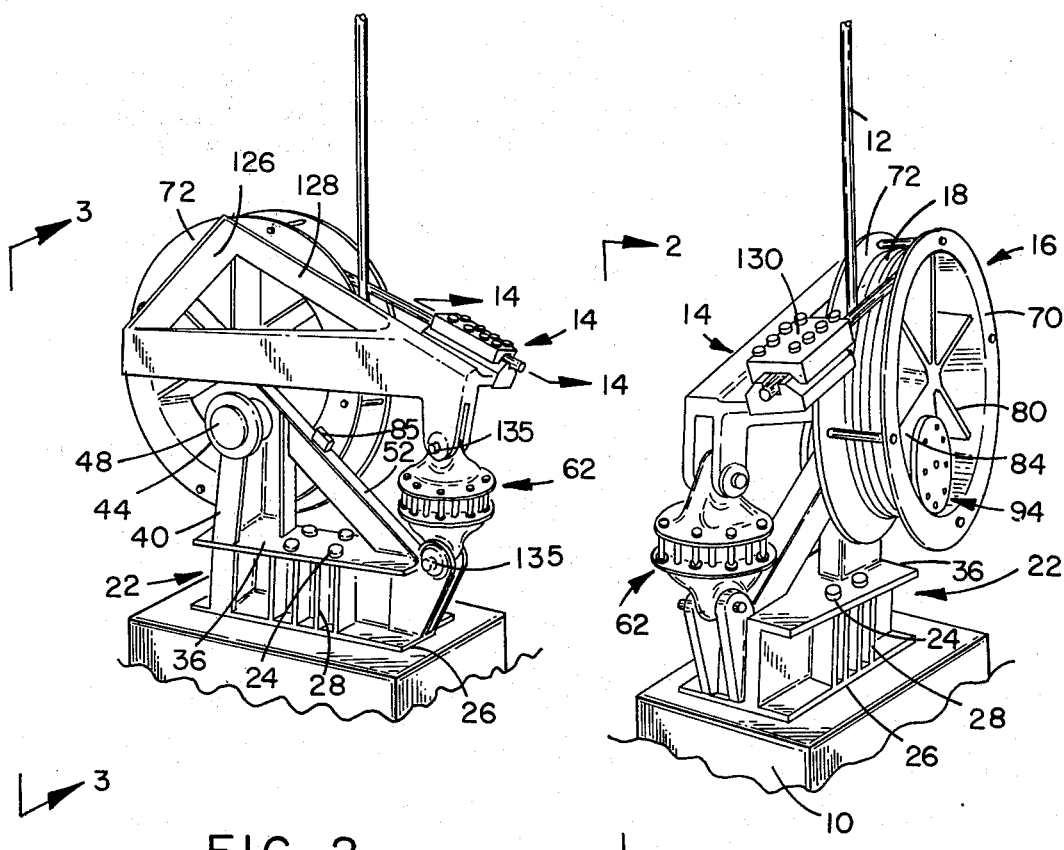
FIG. 1 shows an upright perspective view of the cable anchor of this invention mounted on a fragmented base and having a fragmented portion of a cable wrapped therearound.
FIG. 2 shows a side perspective elevation view of the invention in the direction of lines 2—2 of FIG. 1.
Figures 3, 4:
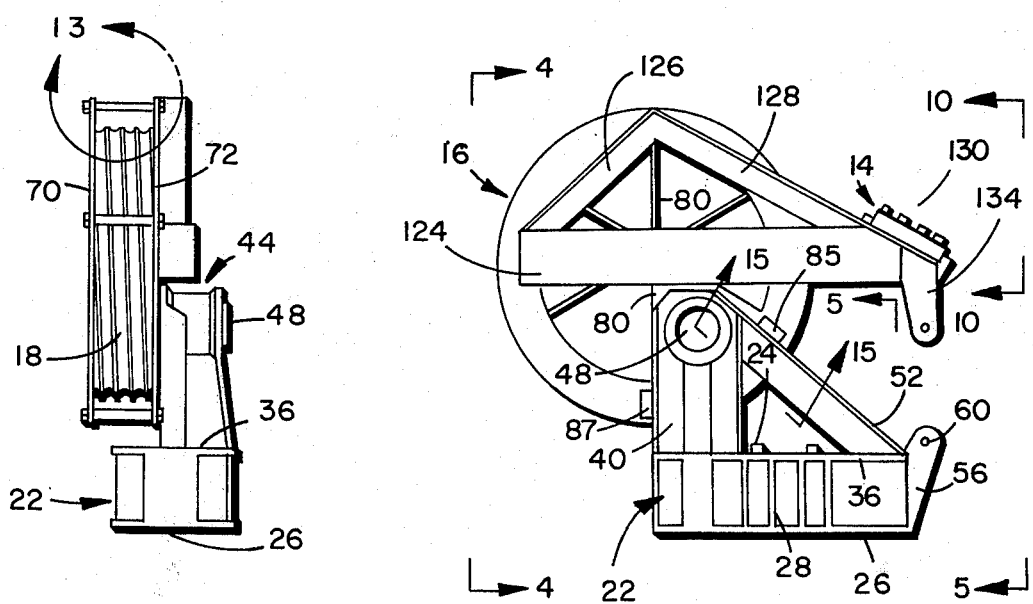
FIG. 3 shows a side elevation view of the invention in the direction of lines 3—3 of FIG. 2 and excludes the mounting base therefor.
FIG. 4 shows an end elevation view in the direction of lines 4—4 of FIG. 3.

Referring now to the Figures, it can be seen in FIG. 1 that a footing 10 is shown upon which the invention is mounted. The footing 10 has apertures, not shown, which receive anchor bolts 24. Alternatively, the anchor bolts 24 can be formed as lag bolts with curved portions or other elements secured to the footing 10.

A cable 12 is fed from a cable supply reel, not shown, through a cable clamp 14 where it wraps several times around a drum 16. From the drum 16, cable 12 leads upward to the reeving and sheaves, not shown, to support the drill.

Figure 13:
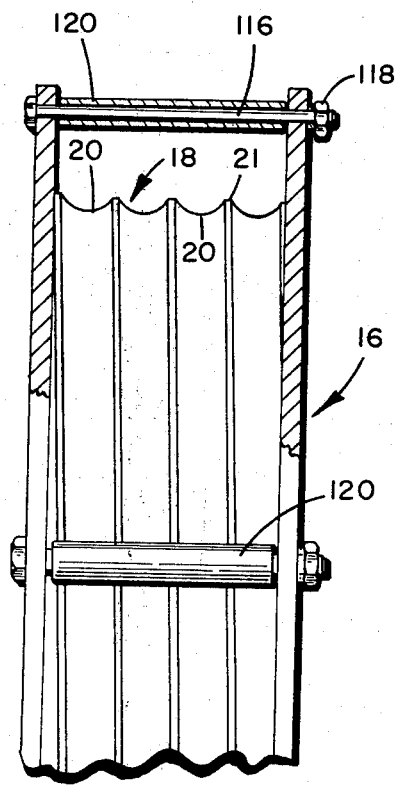
FIG. 13 shows a fragmented sectional view through circle 13 of FIG. 4 to exemplify the circumferentially oriented bolt and tubular bearing surfaces surrounding the bolt.

Specifically, the invention provides an anchoring system by means of the drum 16 having a snubbing surface 18. This snubbing surface 18 as shown in FIG. 13, includes a series of fluted portions 20 that are divided by lands 21, so as to provide a series of grooves for receiving loops of the cable 12.

Looking more particularly at the cable anchor, a base support structure 22 is shown with bolts 24 for securing the base structure 22 to the footing 10.

The base structure 22 is comprised of a bottom plate 26 and a top plate 36 supported by upright side members 32 and 34. As shown in the cross section of FIG. 8, the upright side members 32 and 34 define a channel 30. Webs 28 project from sides 34 to provide additional bracing and strength to the base structure 22.

The cable anchor base structure is secured to the footing 10 by means of anchor bolts 24 which pass through top plate 36, between webs 28, and through bottom plate 26 and footing 10. This is shown in FIGS. 1, 3, 8 and 9.

Figure 8:
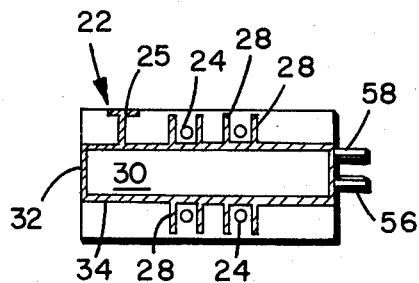
FIG. 8 shows a sectioned cut through the base structure shown in FIG. 6 along lines 8—8 thereof.
Figure 9:
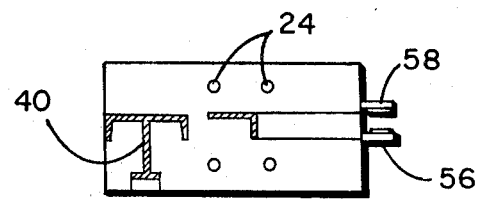
FIG. 9 shows a sectioned view of the structure shown in FIG. 6 along lines 9—9 thereof.
Figure 11:
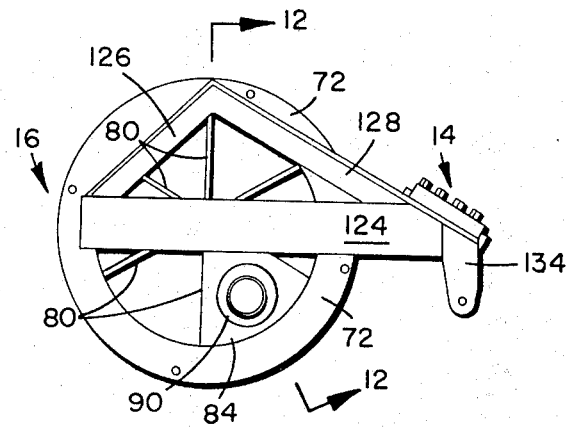
FIG. 11 shows a side elevation view of the drum and weigh beam of this invention in the direction of lines 11—11 of FIG. 10.
Figure 10:
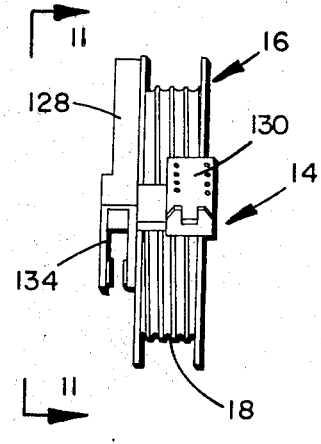
FIG. 10 shows a view of the drum and weigh beam assembly of this invention disassociated from its supporting structure in the direction of lines 10—10 of FIG. 3.
Figure 12:
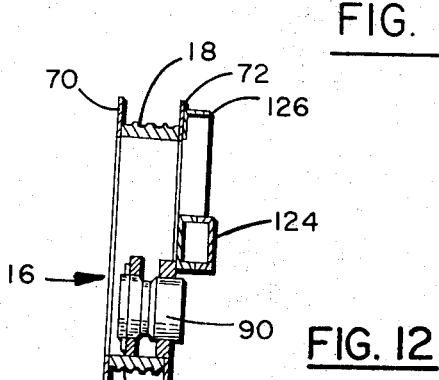
FIG. 12 shows a sectional view through the central axis of the drum and through a radius of the supporting pin for the drum in the direction of lines 12—12 of FIG. 11.
Figure 14:
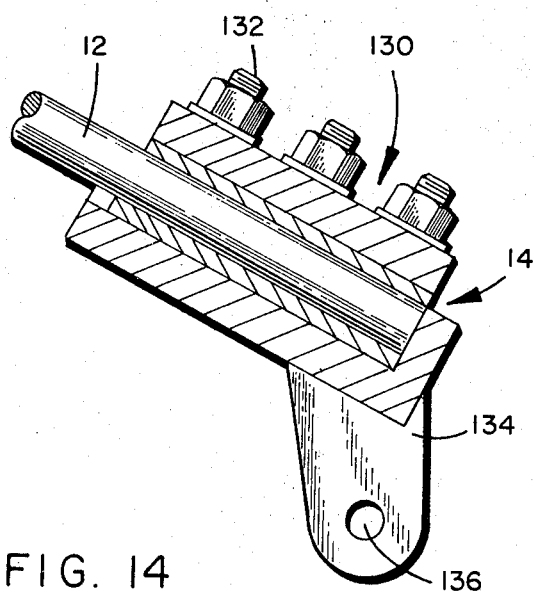
FIG. 14 shows a sectional view of the cable clamping means of this invention through a midsection thereof in the direction of lines 14—14 of FIG. 2.

The top plate 36 supports an upright member 40. The upright member 40 has an angled configuration to provide a degree of strength. In particular, the angle configuration allows for a general cross sectional T-beam type of support function. Additional strength to the upright member 40 is provided below plate 36 by means of a bracing member 25 extending from the side of the base structure 22 and having a T-shape in cross section, as shown in FIG. 8. Though separated by plate 36, bracing member 25 directly underlies upright member 40 to give maximum support thereto.

A journal box 44 near the top of upright 40 can accommodate a spindle 46 extending from the drum 16. The spindle 46 is provided with an end cap 48 that is seen on one side of the drum within the Figures.

Figure 6:
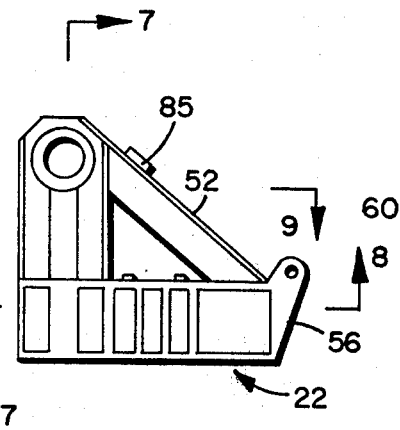
FIG. 6 shows an upright elevation view of the mounting structure for the drum in the direction of lines 6—6 of FIG. 5.
Figure 5:
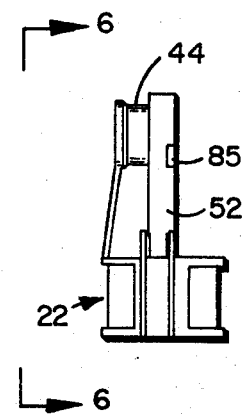
FIG. 5 shows an end view of the mounting structure for the drum in the direction of lines 5—5 of FIG. 3.

The upright member 40 is side braced by means of an angle brace 52 that is secured at one end to the top side of upright member 40 and the other end to the top of the top plate 36. A right triangle is thus formed having as its legs the upright member 40 and top plate 36 and as its hypotenuse the angle brace 52. This can be seen from FIGS. 3 and 6.

The angle brace 52 is coterminal at plate 36 with a pair of ears 56 and 58 which extend from side 32 of the base structure 22. The ears 56 and 58 have aligned openings 60 therein for purposes of receiving a load cell 62.

By way of explanation, the load cell 62 is of a cage type and allows for tension to be exerted through the structure to transmit the tension to a compressible diaphragm. The compressible diaphragm is in fluid connected relationship to a tubular output which is not shown. The tubular output is connected in turn to a meter, such as a Bourdon tube meter, for allowing the pressure against the diaphragm to be reflected as an analog on a meter movement driven by the Bourdon tube.

It is irrelevant as to how the tension on the cable 12 is measured with regard to various load cells. Suffice it to say that any load cell, whether it be a tension load cell or a compression load cell, from which the movement of the invention transmits pressure forces rather than tension forces directly to the diaphrasmatic action is not of consequence. The matter of consequence of this invention is the character of the movement, so that an accurate pressure analog, depending upon fluid, is reflected at the output of the load cell 62.

Figure 15:
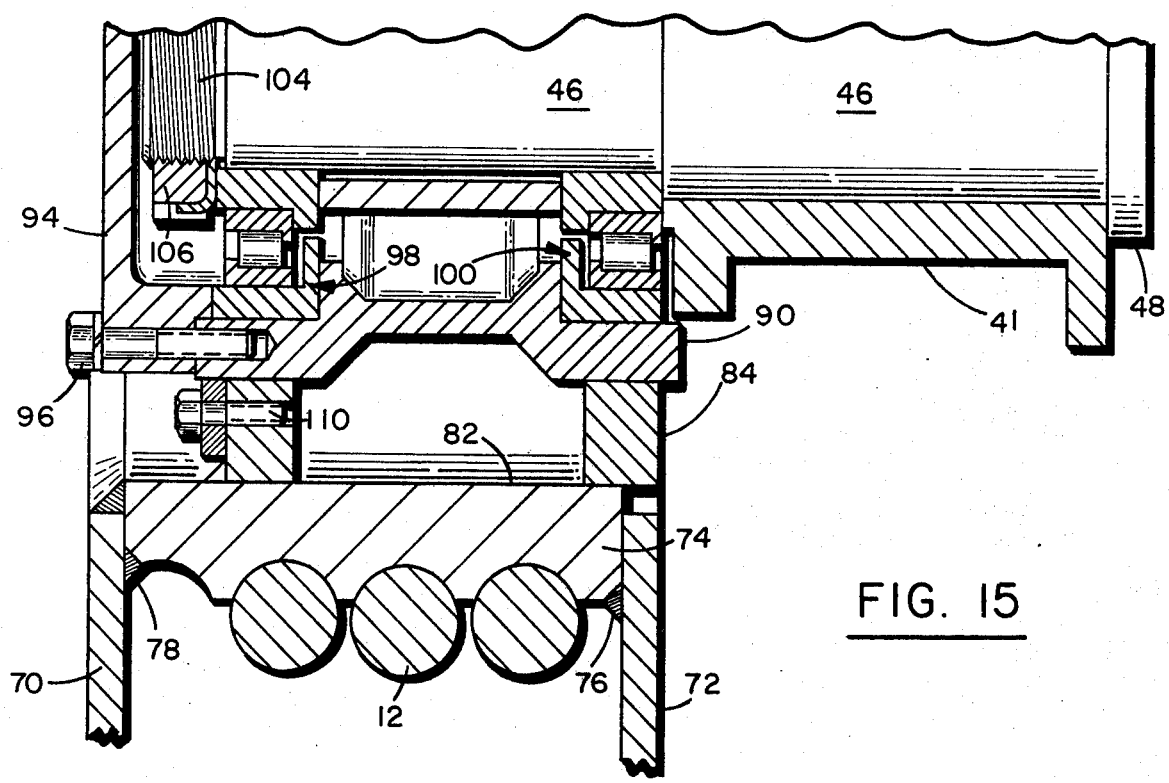
FIG. 15 shows an enlarged fragmented sectional view of the weigh beam and the journal and bearing surfaces of the drum in the direction of FIG. 3; and, FIG. 16 shows a geometric description of the movement of the relevant lines of force.
Figure 7:
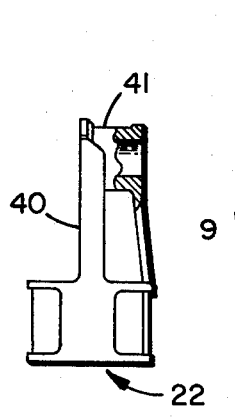
FIG. 7 shows a partially sectioned view in partially fragmented form through the journal support bearing surface along lines 7—7 of FIG. 6.

Looking more particularly at the drum 16 and its associated elements, it can be seen in FIG. 1 that the drum 16 has a portion of the cable 12 wrapped around its snubbing surface 18 within the groove or flutes 20. The drum 16 is comprised of two relatively flat circumferential circular elements 70 and 72 separated by the drum snubbing surface 18. As shown in FIG. 15, the circular elements 70 and 72 have been welded to a fluted portion of the snubbing surface 18. The snubbing surface 18 has welding points with regard to the circular elements 70 and 72 at points 76 and 78. The welding points 76 and 78 effectively weld the entire circular elements 70 and 72 into one continuous drum to provide the function of the drum 16.

The drum 16 at the welding points incorporates a plurality of spokes 80. The spokes 80 are such that they circumscribe an interior surface 82 of the drum 16. The spokes 80 have a triangular pie-shaped bracing plate 84 between the spokes 80. The pie-shaped bracing 84 completely fills and braces the spoke areas in adjacent relationship thereto. Stops 85 and 87 can be affixed to the frame and can serve to engage the drum 16 in any particular manner to prevent it from turning beyond a given point.

The plate 84 receives a tubular support journal 90 which in turn supports spindle 46. The tubular support journal 90 is configured to receive an end plate 94 held in place by bolts 96. The end plate 94 merely serves as a covering to protect a pair of roller bearings 98 and 100 on either side. The roller bearings 98 and 100 incorporate rollers that can be seen in races that allow the spindle 46 to rotate in smooth substantially frictionless movement.

The entire assembly is supported on the support post or upright member 40, having a bore therethrough which receives spindle 46. The spindle 46 is threaded with threads 104 in order to receive a nut 106 thereon. The nut 106 serves to secure the spindle into the drum 16 while at the same time allowing for the movement of the drum on the bearing surfaces provided by the roller bearings 98 and 100.

A bolt 110 is utilized in order to secure the tubular insert 90 into the pie-shaped segment 84 of the drum 16. All of the foregoing allows for the upright 40 to support the drum 16 in the tubular support member 41 of the upright 40.

In order to provide added rigidity to the outer circumferential portion of the drum 16, namely circular segments 70 and 72, a plurality of bolts 116 with nuts 118 attached thereto, are bolted through the outer circumferential area of the circular segments 70 and 72. The bolts 116 are provided with a tubular elongated cylinder 120 so that when cable 12 is passed over the snubbing surface 18 of the drum 16, it allows it to roll freely against the bolts 116, thereby eliminating substantial frictional engagement thereof.

Looking more specifically at the drum 16, the drum is braced with a weigh beam, or torque arm. The torque arm or weigh beam 124 is formed from two channels and welded together along the axial diameter of the drum 16. The weigh beam 124 has two bracing members 126 and 128 that serve to brace the weigh beam 124. The weigh beam 124 is, of course, welded to the outer circumferential portion of the circular segment 72. In addition thereto, circular segment 72 receives welding at the portion where the bracing members 126 and 128 contact the outer surface of the circular portion 72. This serves to increase rigidity, to brace as well as to provide improved action to the entire invention.

More particularly, the weigh beam 124 and the bracing members 126 and 128 enhance the structural art so that the entire drum 16 can be manufactured from a welded assembly rather than being cast. In the prior art, as alluded to in the beginning of the specification, it was indicated that it was necessary to provide a cast drum 16.

At the terminal end of the bracing member 128, a cable clamp 130 is shown having a series of bolts 132 passing therethrough. The clamp 130 receives the cable 12 therein and serves to secure it to the bracing member 128. Additional cable from a supply reel 12, not shown, can be fed into the system by releasing cable clamp 130.

The bracing member 128 has a pair of depending ears 134 with openings 136 that receive a portion of the load cell 62 by means of a bolt 135. Of course, the load cell 62 is bolted into place through the openings 60 and 136 respectively or ears 56 and 134 by bolts that can be either supplied with washers or other means for securing them. In addition, pins with appropriate cotter pins for locking the load cell 62 into the respective openings 60 and 136 can be utilized.

As can be seen from the foregoing description, the drum 16 has a limited movement when the snubbing surface 18 of the drum 16 is moved about the axis provided by the pin or spindle 46. This is due to the different tension moments put on the drum 16. As the different degrees of tension are imposed upon the cable 12, the drum 16 and the attached torque arm or weigh beam 124 move up and down. This movement is transmitted to the load cell 62 at the end of the downwardly depending ears 134. In particular, movement of the weigh beam transmits the load through the opening 136 of the ears 134.

Figure 16:
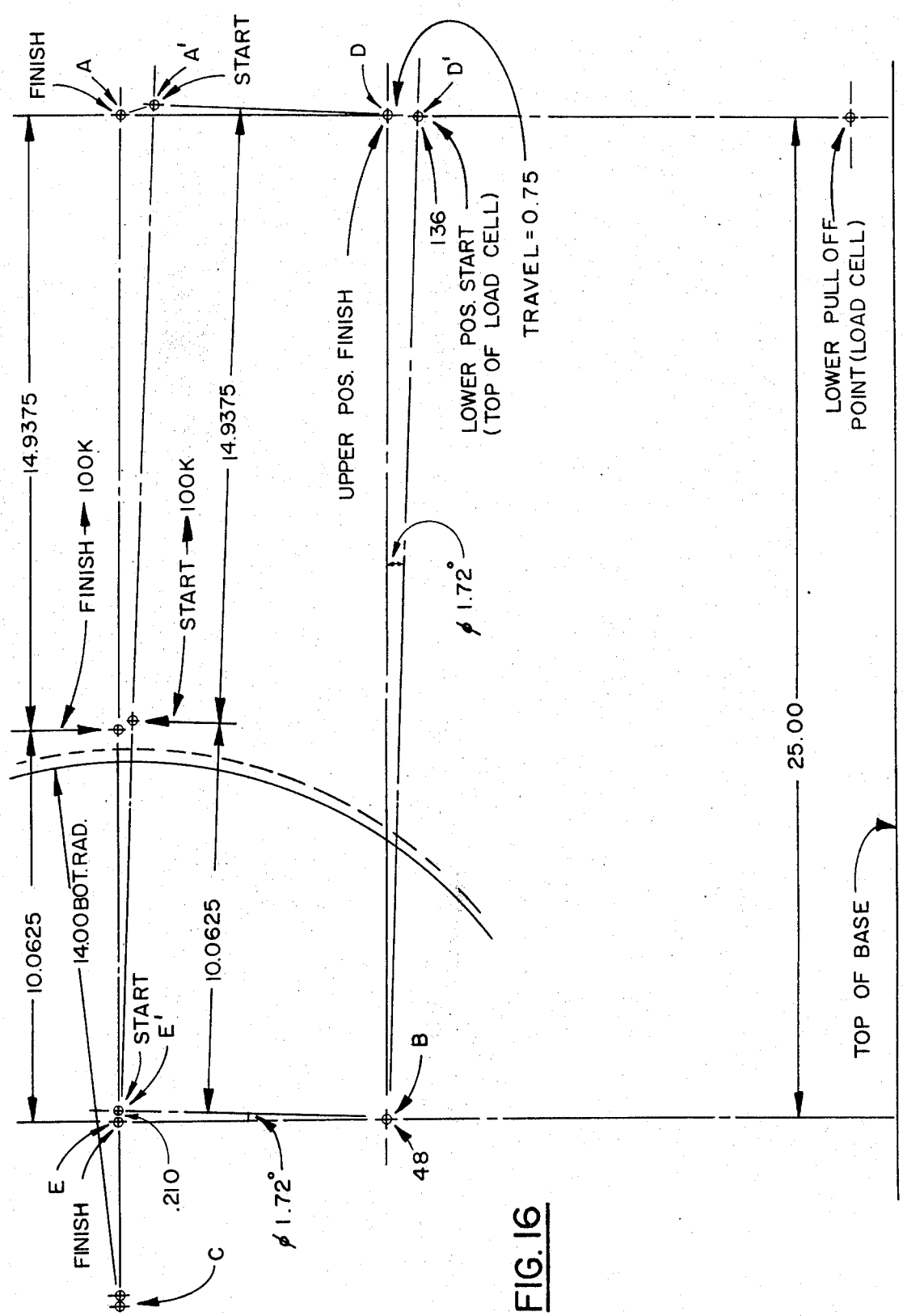

This particular movement is shown in FIG. 16 wherein the opening 136 is moved upwardly. The center point C of the drum 16 shown in FIG. 16 enables a radial relationship to be described so that the point of the movement of the pin hole 136 describes a parallel relationship as to the weigh beam movement and the entire movement of the drum.

As can be seen, the weigh beam movement provided through the lines of force are substantially parallel to one another by virtue of locating the hinge point or pivot point of the central axis of the spindle 46 downward from the central axis C of the drum 16. This not only is effective from the standpoint of orientation of the load cell 62 and the weigh beam 124, but also helps to substantially limit the amount of material required in the cable anchor as compared to prior art devices.

By locating the pivot point or hinge point of the spindle 46 at a portion of the drum 16 downwardly from its central axis, and at the same time placing the weigh beam upwardly and through the central axis of the drum, an optimum position of the hinge point is created for measuring cable tension.

That is, as shown in FIG. 16, the lines of movement as described by the weigh beam which passes through the central axis of the drum together with the placement of the hinge point or central axis defined by the center of the spindle 46 or end cap 48 of the spindle and the top of the load cell at point 136 are substantially parallel. At the start, prior to measuring the tension on a cable, the above points form a parallelogram, starting from the hinge point 48 of B, $E^1$, $A^1$, $D^1$. Upon application of a load to the cable, the lines of force move in substantially parallel direction, so that each point retains the same relationship to each point as existed before movement of the drum. The result is that the parallelogram B, $E^1$, $A^1$, $D^1$ moves at hinge point B to move point $D^1$ to D, $A^1$ to A, and $E^1$ to E. Since vertical lines B $E^1$ and $D^1$ $A^1$ are parallel, and horizontal lines B $D^1$ and $E^1$ $A^1$ are parallel, the relationship between these points remains constant with movement around hinge point B.

Fundamentally, the lines of movement as described by the weigh beam, central axis thereof, the vertical axis related thereto and the lines of movement with respect to the radii never change respectively due to the position of the spindle 46 being in its lower displaced relationship from the central axis of the drum 16. In other words, when the drum 16 rocks around its hinge point 46 at the central axis of the spindle, the movement of the lines in parallelogram B $E^1$ $A^1$ $D^1$ at the central axis of the spindle, are relatively parallel and remain parallel because of their relative position in the cable anchor.

Regardless of the amount of tension in the cable 12 that is to be measured and the movement of the drum 16, a constant relationship is maintained as to the overall movement of the opening in the ear, namely opening 136 at point $D^1$ of FIG. 16, this being the point that moves with respect to the load cell. Thus, in effect, a smooth performance is provided throughout the entire device without substantial distortion. In effect, a substantially linear relationship is maintained as to the loading position over the given range of tension in which the drum 16 rotates and helps to exclude extrinsic vectorial loading forces.

Thus, this invention is to be read broadly in light of the foregoing improvement by virtue of the fact that the relationship of the weigh arm and angular beam structure provides a superior drum, and overall cable anchor. Additionally, the cable can be easily moved around the snubbing surface of the drum through the improved circumferential roller surfaces. Furthermore, the patentability is substantially enhanced by the operative readout enhancement features of the weigh beam with respect to the drum which provides an improved readout over a broad range.

We claim:

1. An improved cable anchor comprising:
    a base member which is adapted for mounting to a foundation of a derrick;
    a drum for receiving a cable around at least a portion of its circumference;
    a spindle connected to said drum for allowing rotational movement of said drum on said spindle;
    spindle support means connected to said base member for supporting said spindle thereon;
    a weigh beam welded to said drum; and,
    a reinforcing brace connected to said weigh beam extending upwardly in welded relationship to the outer portion of said drum for reinforcing said drum and said weigh beam.

2. The improved anchor of claim 1 further comprising:
    said weigh beam having cable clamps attached thereto for clamping the cable received around said drum.

3. The cable anchor as claimed in claim 1 further comprising:
    a plurality of bolts extending around the circumference of said drum; and,
    overlying tubular members which are free to rotate on said bolts so that when a cable is passed between the bolts and the surface of said drum, frictional engagement is decreased.

4. The improved anchor as claimed in claim 1 further comprising:
    ears depending from one end of said weigh beam and extending beyond the circumference of said drum; and,
    means adapted on said base member and said ears for connecting a load cell thereto so that loads imposed on said weigh beam by tension on the cable wrapped around said drum will effectuate a readout by an analog of pressure within said load cell.

5. The improved anchor as claimed in claim 4 wherein:
    said drum has a plurality of flutes on the surface thereof around which the cable is wrapped.

6. The improved anchor as claimed in claim 1 further comprising:
    a plurality of spokes emanating from a central axis of said drum which have been welded to the inner surface of said drum.

7. The improved anchor as claimed in claim 1 wherein:
    said spindle being connected to said drum in displaced relationship from the central axis of said drum.

* * * * *